Dec. 9, 1924.                                                          1,519,080
F. H. WOOD
DIRECTION INDICATOR FOR VEHICLES
Filed Dec. 13, 1921          3 Sheets-Sheet 1
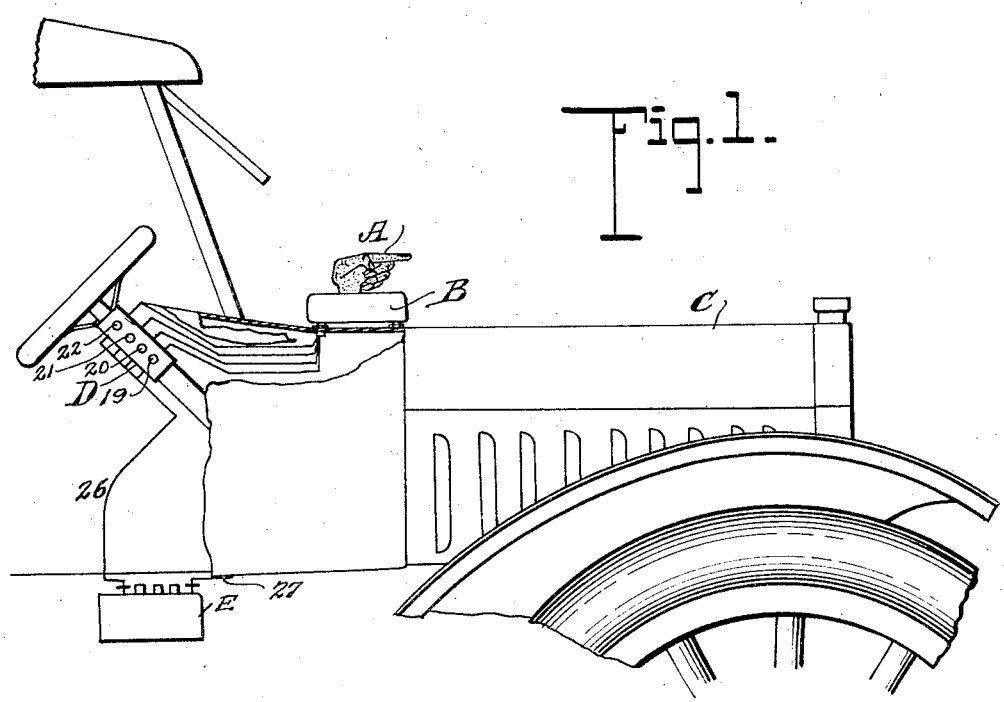
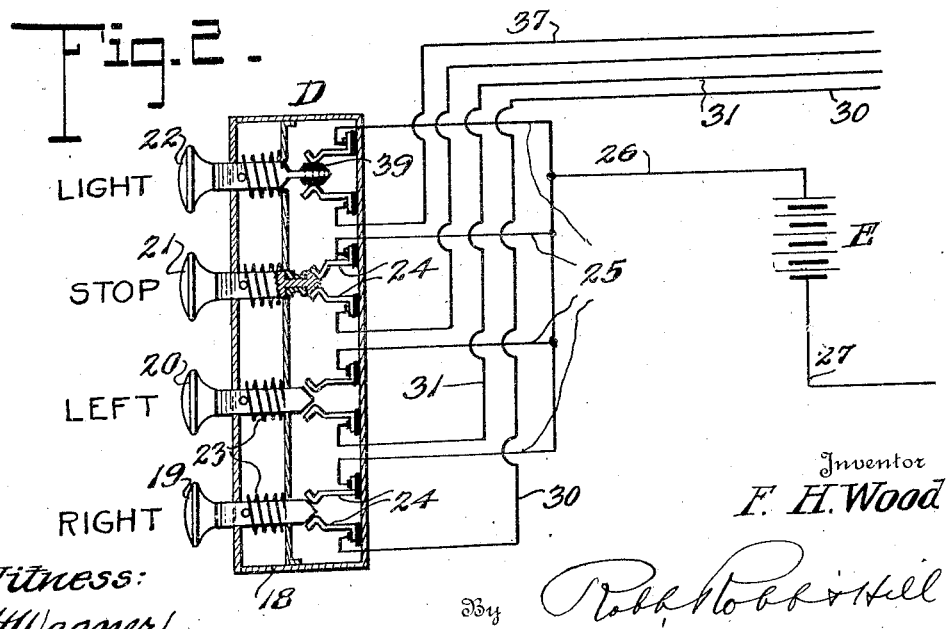
Witness:
E. H. Wagner.
Inventor
F. H. Wood
By Robb, Robb & Hill
Attorneys

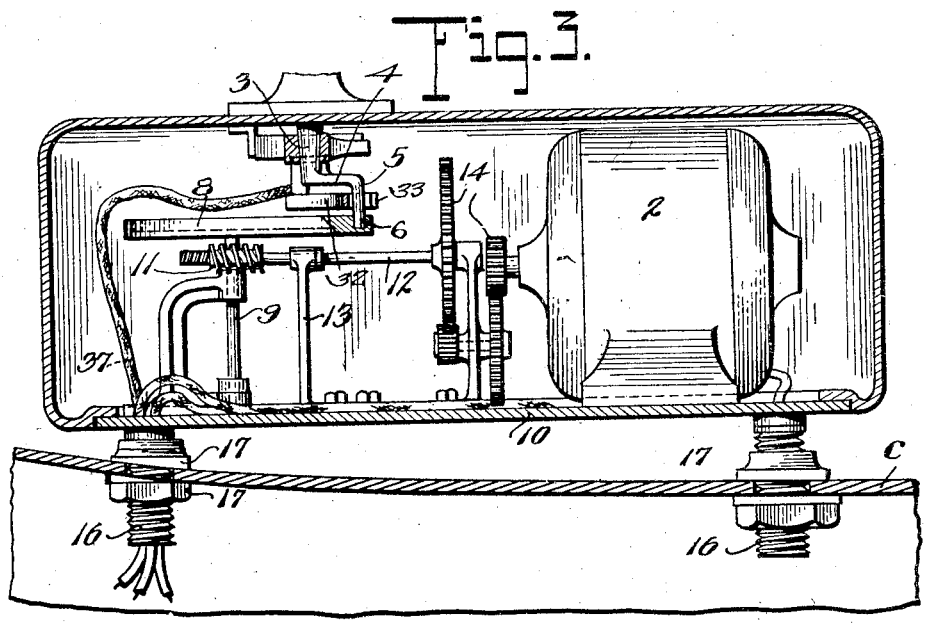
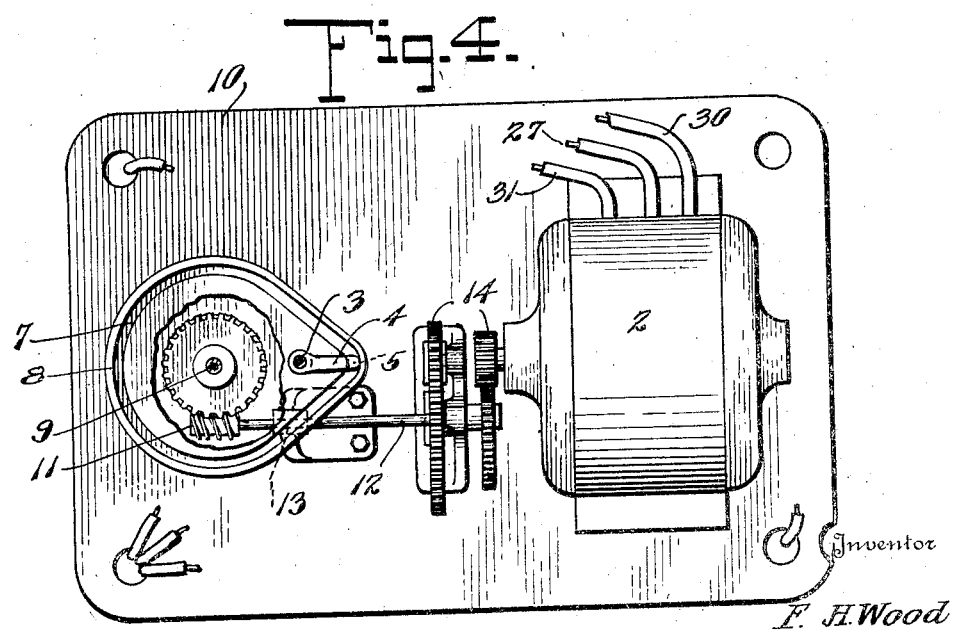

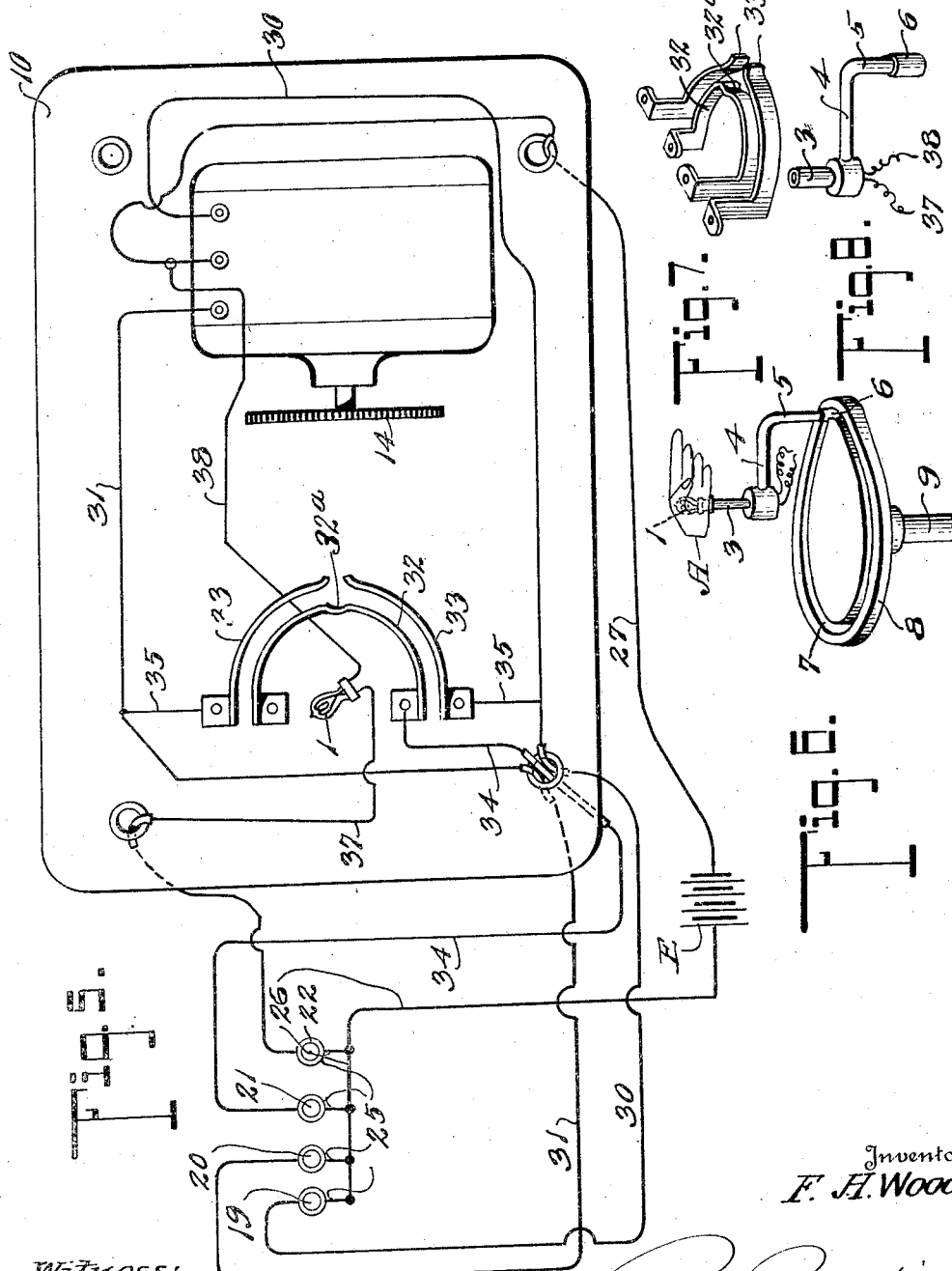

Patented Dec. 9, 1924.

1,519,080

UNITED STATES PATENT OFFICE.

FRED H. WOOD, OF FARGO, NORTH DAKOTA.

DIRECTION INDICATOR FOR VEHICLES.

Application filed December 13, 1921. Serial No. 522,127.

*To all whom it may concern:*

Be it known that I, FRED H. WOOD, a citizen of the United States, residing at Fargo, in the county of Cass and State of North Dakota, have invented certain new and useful Improvements in Direction Indicators for Vehicles, of which the following is a specification.

The present invention relates to a direction indicator for vehicles, and has for its object to provide a device of this character which embodies novel features of construction whereby the driver of a vehicle can indicate to pedestrians and the drivers of other vehicles that he is about to make a turn either to the right or to the left.

Further objects of the invention are to provide a direction indicator which can be readily mounted in position upon any vehicle, which can be easily manipulated, which is positive and dependable in its operation, and which leaves both hands of the driver free for use in manipulating the steering wheel or doing other necessary things when making the actual turn as signalled by the device.

With the above and other objects in view, the invention consists in certain combinations and arrangements of the parts as will more fully appear as the description proceeds, the novel features thereof being pointed out in the appended claims.

One of many possible mechanical embodiments of the invention is illustrated by the accompanying drawings in which:

Figure 1 is a fragmentary side elevation of the front end of a motor vehicle having a direction indicator constructed in accordance with the invention mounted thereon.

Figure 2 is a detail view of the switch board and buttons which are utilized for controlling the indicator, being shown in the present instance as mounted upon the steering post of the vehicle.

Figure 3 is an enlarged sectional view through the operating mechanism for the indicator.

Figure 4 is a top plan view thereof with the casing removed, portions being broken away and shown in section.

Figure 5 is a diagram of the electric circuits.

Figure 6 is a detail view of the pointer and cam mechanism for moving the same to indicate a turn either to the right or to the left.

Figure 7 is a detail view of the contact strips which are engaged by the crank arm of the indicator shaft, and Figure 8 is a detail view of the crank arm of the indicator shaft.

Corresponding and like parts are referred to in the following description and indicated on all of the views of the drawings by like reference characters.

Referring to the drawings, which illustrate one embodiment of the invention, the reference character A designates the indicator or pointer which is mounted in a conspicuous position upon the vehicle so that it can be readily seen by pedestrians and the drivers of other vehicles. The indicator normally points straight ahead, although it is adapted to be turned so as to point either to the right or to the left by the operation of a mechanism which is housed within the casing B upon which the pointer A is mounted. This casing can be secured to the vehicle in any suitable or appropriate position, being shown in the present instance as attached to the cowl of a conventional motor vehicle C, just in front of the windshield thereof. The indicator is controlled in its movements by suitably manipulating the keys or buttons of a switch board D which is mounted in such a position as to be readily accessible to the driver of the vehicle. The switch board D is shown on the drawing as mounted upon the steering post just below the steering wheel so that the desired key or or button of the switch board can be readily manipulated or depressed at any time.

The pointer or indicator A may be of any suitable design or construction, although it is preferably constructed so that it can be illuminated and rendered visible at night. For this purpose the pointer is preferably hollow and formed of translucent material so that it can be illuminated by an incandescent lamp 1 suitably mounted within the interior thereof. The pointer may be of any suitable design and it is illustrated on the drawing as being in the form of a hand. As will be subsequently brought out, the lamp 1 is controlled by an appropriate button on the switch board D so that it can be turned off during the day and turned on at night.

The pointer or indicator is actuated by means of a mechanism driven by an electric motor 2 which is housed within the casing B, and the arrangement is such that after the driver has manipulated the proper key or button of the switch board D for causing the pointer to indicate a turn in either direction, the pointer will be automatically turned in the proper direction where it will remain for a period of time corresponding to that usually necessary to make a turn, after which the pointer will be automatically returned to its original position. After the first manipulation of the switch board key the signal requires no further attention from the driver of the vehicle and the driver has both hands free for use in turning the steering wheel or doing other necessary things in making the turn. All of the movements of the indicator take place entirely automatically, even including the return thereof to normal position, after the first manipulation of the switch board key.

The pointer A is mounted upon the upper end of a hollow vertical shaft 3 which extends through the top of the casing B, being journalled in suitable bearings therein, and terminating at its lower end in a crank arm 4. The end of the crank arm is formed with a depending finger 5 having a roller 6 at the extremity thereof which operates in an annular groove 7 formed in the upper face of a disc 8 which is carried by the upright shaft 9, said shaft being journalled within suitable bearings supported by the base plate 10 of the casing B. The groove 7 has a portion which is concentric with the shaft 9 and another portion which is pointed or eccentric with relation thereto and the roller 6 is normally positioned within the eccentric portion of the groove 7, as indicated by Figs. 3 and 4. It will be obvious, however, that if the disc 8 is turned in either direction, the pointer A will be correspondingly rotated and the roller 6 brought into the concentric portion of the groove to retain the pointer in its rotated position. This position will be maintained by the pointer until the disc has made one complete revolution and the roller 6 is again permitted to enter the eccentric or pointed portion of the groove at which time the pointer A will return to its original position. It will thus be obvious if the disc 8 is slowly rotated in either direction for one complete revolution, the pointer A will be quickly turned in the corresponding direction and maintained in its rotated position as long as the roller 6 remains in the concentric portion of the groove 7. When the rotation of the disc is completed and the roller 6 again enters the eccentric portion of the groove, the pointer A will be returned to its original position. The mechanism for rotating the disc 8 is timed so that the time consumed in imparting one complete turn to the disc corresponds to the time usually required by the driver of the vehicle to turn a corner. It will thus be obvious that the mechanism for imparting one complete rotation to the disc 8 operates to turn the pointer A, maintain the pointer in its turned position for a predetermined time, and then to return the pointer to its original position.

The disc shaft 9 is connected by worm gearing 11 to a horizontally disposed drive shaft 12 which is journalled in a suitable bearing 13 carried by the base plate 10. This drive shaft 12 is also connected by a chain of gearing 14 to an electric motor 15 which is arranged within the casing B. Power is thus transmitted from the electric motor to the disc 8 for the purpose of rotating the latter, although the speed of the motor is appropriately reduced through the gearing 11 and 14 so that the disc rotates with a comparatively slow speed and requires substantially the same length of time to complete one revolution that the driver of the machine ordinarily requires to turn a corner. It will be noted that the disc 8 with the cam groove therein, together with the mechanism for driving the disc are all permanently mounted upon the base plate 10, while the pointer A with the crank 4 is carried by the casing B. The casing forms a housing for all of the mechanism, but detachably engages the base plate 10 so that it can be readily lifted from position for the purpose of enabling access to be readily obtained to the mechanism for the purpose of repairing and adjusting the same. In this connection, it will be noted that the end of the finger 5 slips freely into the groove 7 so that the casing B can be lifted from position and replaced without difficulty.

The base plate 10 is shown as supported in position by a series of depending tubular feet 16 which are exteriorly threaded to receive the clamping nuts 17. These tubular feet are shown as projecting downwardly through suitable openings formed in the sheet metal shell of the motor vehicle, and the nuts 17 engage the top and bottom of the shell to clamp the parts rigidly in an adjusted position. Adjustment can be made to hold the casing B in a horizontal position, and the tubular feet 16 provide a means for leading the electric wires from the motor vehicle into the casing B without permitting the wires to be exposed on the outside of the vehicle.

The switch board D comprises a suitable casing 18 having a series of plungers 19, 20, 21 and 22 slidably mounted therein. Springs 23 normally tend to restore the plungers and hold them in inoperative position. The base of the casing is provided with a pair of insulated spring contact fingers 24 for each of the plungers. One of the contact fingers 24 of each pair is connected by a branch wire 25 to a main wire 26 which leads to one terminal of a suitable source of electrical energy, such as the battery E. The other terminal of the battery is connected by a wire 27 to the middle terminal 28 of the electric motor 15. An end terminal 29 is located on each side of the middle terminal 28, thereby providing for reversing the flow of the electric current through the motor and reversing the direction of rotation of the motor so that the pointer A can be turned either to the right or to the left. One of the end terminals 29 of the motor is connected by a wire 30 to the other contact finger 24 of the switch plunger 19. When this plunger is pressed inwardly to close the circuit, the motor is driven in such a direction as to turn the indicator A to the right. The other end terminal 29 of the motor is connected by a wire 31 to the other contact finger 24 of the switch board plunger 20, so that when this plunger or button is pressed inwardly to close the circuit, the electric motor is driven in the opposite direction and the indicator A turned to the left. As will be subsequently described, the switch board plunger 21 provides a means for stopping the mechanism at any time, while the switch board plunger 22 controls the light. For convenience, the finger piece or button on the plunger 19 may be designated "Right," the finger piece on the plunger 29 "Left," the finger piece on the plunger 21 "Stop," and the finger piece on the plunger 22 "Light."

It is desired to provide for the continued driving of the motor and rotation of the cam disc 8 after the motor has once been started, and without the necessity of the operator keeping the switch board plunger 19 or 20 depressed. These switch board plungers 19 and 20 are automatically returned to their original positions by the action of the springs 23 as soon as they are released and, in the absence of some special provisions, it would be necessary for the operator to hold the switch board plunger 19 or 20 depressed until the pointer A had been operated in the desired manner, and this would be objectionable since it would not leave both hands free for use in doing the necessary things when making a turn with the vehicle. In order to eliminate this difficulty, the finger 5 of the crank shaft which carries the pointer A, is caused to travel in a path between a substantially semi-circular spring strip 32 and a pair of shorter substantially quadrant-shaped spring strips 33. A wire 34 leads from the longer strip 32 to the other spring contact finger 24 of the switch board plunger 21 which is designated "Stop." The metal core of this "stop" plunger normally engages the corresponding contact fingers 24 and bridges the same so that the long strip 32 is normally in direct connection with one of the terminals of the battery E. The shorter or quadrant-shaped spring strips 33 are connected by the short wires 35 to the respective wires 30 and 31.

When the pointer A is in normal position and points straight ahead, the finger 5 of the crank arm is at the center of the long semi-circular contact strip 32 and between the ends of the shorter and quadrant-shaped spring strips 33. A depression 32$^a$ may be provided at the middle portion of this spring strip 32 to retain the crank arm resiliently in this position. The finger 5 is then out of contact with both of the quadrant-shaped strips 33 so that the motor circuit is not closed through the strips 32 and 33. When either of the switch board plungers 19 or 20 is depressed the motor circuit is closed and the motor started in operation. The initial movements of the motor cause the crank 4 to be turned and the finger 5 brought into engagement with one of the quadrant-shaped strips 33 depending upon which of the plungers has been depressed and the direction in which the motor is driven. As soon as the finger 5 of the crank arm engages either of the strips 33, it bridges the space between the said strip 33 and the longer strip 32 so that the motor circuit is closed through the said strips and the contact fingers 24 for the "stop" plunger of the switch board. The motor circuit will remain closed and the motor will continue to run, even though the switch board plunger 19 or 20 which was depressed to start the motor is released and returned to its original position by the spring 23. When the switch board plunger 19 is first depressed, for instance, the circuit is from the battery through the wires 26 and 25 to the contact fingers 24 of the plunger 19, thence through the wire 30 to the motor 15, and from the motor back to the battery through the wire 27. As soon as the motor has been started, and the finger 5 of the crank shaft brought into engagement with the corresponding small quadrant-shaped strip 33, the circuit is from the battery to the "stop" plunger 21 of the switch board through the wires 26 and 25, thence to the semi-circular contact strip 32 through the wire 34, from the strip 33, through the wires 35 and 30 to the motor, and from the motor back to the battery through the wire 27. As soon as the cam disc 8 has made one complete revolution and the roller 6 of the crank arm has again been brought into the pointed or cam portion of the groove 7, the crank arm and pointer A are returned to their original positions and the finger 5 of the crank arm is again brought into the depression 32$^a$ of the semi-circular contact strip 32. In this position the finger 5 is disengaged from either of the quadrant-shaped strips 33, so that the motor circuit is automatically broken after the disc has made one complete revolution. It will thus be obvious that if the operator presses either of the switch board plungers 19 or 20, depending upon whether he intends to make a left hand turn or a right hand turn, he can release the plunger after it has been depressed so that both of his hands will be free, and the motor will continue to run until after the disc 8 has made one complete revolution. This complete revolution of the disc will operate as previously described, to turn the pointer in the desired direction, hold it in a turned position for a predetermined time, and then return it to its original position. The only thing the driver has to do is to initially press the proper button and start the motor, after which the operation of the indicator is entirely automatic.

In the event the driver of the vehicle finds it necessary to change his mind or alter his plans, after pressing one of the switch plungers 19 or 20, the motor can be instantly stopped at any time by pressing inwardly upon the switch board plunger 21 which is designated "Stop." When this plunger is pressed inwardly the corresponding spring contact fingers 24 are brought into engagement with insulation 36 applied to the sides of the plunger. This breaks the motor circuit and immediately stops the motor. At some convenient time, the plunger or button 21 can be forcibly pulled outwardly to its original position, whereupon the motor circuit will be again closed and the motor will operate until the usual cycle of movements has been completed and the pointer or indicator A is returned to its original position.

The plunger or button 22 of the switch board which is designated "Light" controls the illumination of the incandescent lamp 1 which is mounted within the hollow pointer A. A wire 37 leads from one of the spring contact fingers 24 of the plunger 22 to the lamp 1, and another wire 38 leads from the lamp to the wire 27 through which the return circuit through the battery is completed. In this connection, it will be remembered that the vertical shaft 3 carrying the pointer is tubular, and this provides for wiring the lamp 1 without difficulty. When the "light" plunger 22 is pulled outwardly, the corresponding spring contact fingers 24 engage insulation 39 on the stem thereof so that the light circuit is broken. When the "light" plunger 22 is pushed inwardly, the contact fingers 24 for the plunger are brought into engagement with opposite sides of the metallic stem of the plunger so that the light circuit is closed and the lamp 1 caused to illuminate the pointer or indicator A. The switch board plungers 19 and 20 are automatically returned to their original positions by the springs 23 as soon as they are released, although the switch board plungers 21 and 22 will remain in either an in or an out position and must be forcibly moved in and out.

In the normal position of the parts, the motor is at rest and the roller 6 of the crank shaft 3 is in the pointed or cam portion of the groove 7 with the indicator pointing straight ahead. The switch board buttons 19, 20 and 21 are normally out, although the button 22 which controls the light may be either in or out depending upon whether or not the pointer or indicator A is to be illuminated. When driving during the day, it is not necessary to use the lamp 1, although at night, it is desired to illuminate the pointer A so that it will be clearly visible. When the driver is about to turn a corner or make a turn either to the right or left, he presses inwardly upon the corresponding plunger 19 or 20 to start the motor, and then releases the plunger so that he has both hands free. After the motor has once been started, the motor circuit is closed through the auxiliary switch which is controlled by the movements of the pointer and comprises the strips 32 and 33 in connection with the finger 5 of the crank shaft 3. The motor circuit is kept closed by this auxiliary switch until after the cam disc 8 has made one complete revolution, after which the parts are all returned to their original positions and the auxiliary switch automatically operated to open the circuit and stop the motor. The full cycle of movements is entirely automatic and the parts are operated and returned to their normal positions without the need of any further thought on the part of the driver. If it is desired to stop the operation of the signal after one of the buttons 19 or 20 has been pressed inwardly and the motor started, the driver presses inwardly upon the "stop" plunger or button 21. This operates, as has been previously described, to break the motor circuit and to stop the motor, and at some convenient time and place the driver subsequently pulls the "stop" plunger 21 outwardly, whereupon the motor circuit is closed and the motor runs until the usual cycle of movements has been completed. Ordinarily, however, no further attention is required on the part of the driver after one of the plungers 19 or 20 has been pushed inwardly, the entire cycle of operations being automatic, and being regulated to consume about the same time that is taken by a vehicle in making a turn.

While I have illustrated and described one particular embodiment of my invention in detail, it will be understood that many modifications and changes can be made in the details of construction without departing in any manner from the scope and spirit of the invention.

Having thus described my invention what I claim as new and desire to secure by Letters Patent is:

1. A direction indicator including a pointer, a motor, means between the motor and pointer for moving the pointer from a non-signalling to a signalling position, holding it in a signalling position for a predetermined time, and returning it to non-signalling position during the continuous operation of said motor, and means for controlling the motor.

2. A direction indicator including a pointer, a motor, means between the motor and pointer for moving the pointer from a non-signalling to a signalling position, holding it in a signalling position for a predetermined time and returning it to non-signalling position during the continuous operation of said motor, and selective means for starting the motor and causing it to turn the pointer in the selected direction.

3. A direction indicator including a pointer, a motor, means between the motor and pointer for moving the pointer from a non-signalling to a signalling position, holding it in a signalling position for a predetermined time and returning it to non-signalling position during the continuous operation of said motor, means for starting the motor, and means for stopping the motor at any time before the cycle of operation is completed.

4. A direction indicator including a pointer, a motor, means between the motor and pointer for moving the pointer from a non-signalling to a signalling position, holding it in a signalling position for a predetermined time and returning it to non-signalling position during the continuous operation of said motor, selective means for starting the motor in operation and causing it to turn the pointer in a selected direction, and means for stopping the motor at any time before the cycle of operation is completed.

5. A direction indicator including a pointer, an electric motor, means between the motor and pointer for moving the pointer from a non-signalling position to a signalling position, holding it in a signalling position for a predetermined time and then returning it to non-signalling position during the continuous operation of said motor, and means for closing the motor circuit during the said cycle of operation, and for automatically stopping the motor when the cycle of operations has been completed.

6. A director indicator including a pointer, an electric motor, means between the motor and pointer for moving the pointer from non-signalling to signalling position and returning it to non-signalling position during the continuous operation of said motor, a manually operated switch for starting the motor, and an auxiliary switch for keeping the motor circuit closed until the cycle of operations has been completed and then breaking the circuit to stop the motor.

7. A direction indicator including a pointer, an electric motor, means between the motor and pointer for moving the pointer from non-signalling to signalling position and returning it to non-signalling position during the continuous operation of said motor, a manually operated switch for starting the motor, and an auxiliary switch operated automatically by a part of the mechanism for keeping the motor circuit closed until after the full cycle of operations has been completed and then opening the circuit to stop the motor.

8. A direction indicator including a pointer, an electric motor, means between the motor and pointer for moving the pointer from non-signalling to signalling position and returning it to non-signalling position during the continuous operation of said motor, a manually controlled selective switch mechanism for starting the motor to turn the pointer in either direction, an auxiliary switch operated automatically by the mechanism to maintain a closed motor circuit until the cycle of operations has been completed and to then open the circuit and stop the motor, and manually controlled means for stopping the motor at any time before the completion of the cycle of operations.

9. A direction indicator including a pointer, a crank member controlling the pointer, a reversible cam element operatively associated with the crank member for operating the same to turn the pointer and then restore it to its original position, a motor for driving the cam member, and switch means selectively controlling the motor to determine the direction of movement of the pointer.

10. A direction indicator including a pointer, a crank member controlling the pointer, a reversible cam element associated with the crank member for turning the pointer in either direction and then restoring it to its original position, a motor for driving the cam member, a manually operated switch for starting the motor, and auxiliary contacts bridged automatically by the crank member for keeping the motor circuit closed a predetermined time and then stopping the motor.

11. A direction indicator including a pointer, a shaft carrying the pointer and provided with a crank arm having a finger, a reversible operating member having a continuous groove therein receiving the finger and a face cooperating therewith to control turning of the pointer, a motor for driving the operating member, and selective means controlling the motor.

12. A direction indicator including a pointer, a shaft carrying the pointer and provided with a crank arm having a finger, a reversible operating disc provided with a cam groove receiving the finger and cooperating therewith to control the movements of the pointer, a motor for driving the disc, manual means for starting the motor, and supplemental means for keeping the motor in continuous operation for a predetermined time and then automatically stopping the motor.

13. A direction indicator including a pointer, a shaft carrying the pointer and formed with a crank arm having a finger, a reversible operating disc provided with an annular groove receiving the finger and having a cam portion whereby the groove cooperates with the finger to turn the pointer, hold it in a turned position and then restore it to its original position when the disc is rotated a predetermined amount, a motor for driving the disc, means for starting the motor, and auxiliary means controlled by the crank arm for keeping the motor in operation until the cycle of movements has been completed and then automatically stopping the motor.

14. A direction indicator including a pointer, a shaft carrying the pointer and formed with a crank arm having a finger, an operating disc formed with a cam groove receiving the finger and cooperating therewith to produce a predetermined cycle of movements of the pointer upon a certain movement of the operating disc, a motor for driving the operating disc, a manually operated switch for starting the motor, and an auxiliary switch including spaced contact strips bridged by the pin of the crank shaft for keeping the motor in operation until the cycle of movements has been completed and then automatically stopping the motor.

15. A direction indicator including a pointer, a shaft carrying the pointer, a crank arm upon said shaft, a reversible cam element cooperating with the crank arm to produce a predetermined cycle of movements of the pointer upon a certain movement of the cam element, a motor for driving the cam element, a manually operated switch for starting the motor, an auxiliary switch and circuits controlled automatically by the crank arm for keeping the motor circuit closed until the cycle of operations has been completed and then automatically stopping the motor, and a manually controlled switch for stopping the motor at any time before the cycle of operations has been completed.

16. A direction indicator including a pointer, mechanism operatively connected with the pointer for producing a continuous predetermined cycle of movements thereof, means for starting the mechanism into action, and automatic means cooperating with the pointer operating mechanism for keeping the mechanism in action and then stopping it when the cycle of movements has been completed.

17. A direction indicator including a casing having a base and removable upper portion, a crank shaft carried by the removable portion, a pointer upon the crank shaft, an operating member upon the base provided with a groove loosely receiving a member from the crank shaft whereby the upper portion of the casing with the crank shaft and pointer can be readily removed and placed in position relative to the operating member, and means for driving the operating member to rotate the crank shaft and pointer.

In testimony whereof I affix my signature.

FRED H. WOOD.